US006796349B2

United States Patent
Tozawa et al.

(10) Patent No.: US 6,796,349 B2
(45) Date of Patent: Sep. 28, 2004

(54) PNEUMATIC TIRE INCLUDING PROTRUSION DIVIDING GROOVE SPACE OF MAIN GROOVE HAVING GROOVE WIDTH NARROWED DURING INFLATION

(75) Inventors: Yukio Tozawa, Hiratsuka (JP); Hiroshi Iizuka, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 69 days.

(21) Appl. No.: 09/881,698

(22) Filed: Jun. 18, 2001

(65) Prior Publication Data

US 2001/0054464 A1 Dec. 27, 2001

(30) Foreign Application Priority Data

Jun. 21, 2000 (JP) ......................... 2000-186774

(51) Int. Cl.[7] ................. B60C 11/12; B60C 11/13
(52) U.S. Cl. ................. 152/209.5; 152/209.19; 152/209.23; 152/DIG. 3
(58) Field of Search ................. 152/209.19, 209.23, 152/209.24, 209.27, 209.5, DIG. 3

(56) References Cited

U.S. PATENT DOCUMENTS

| 2,254,622 | A | * | 9/1941 | Overman |
|---|---|---|---|---|
| 2,708,957 | A | * | 5/1955 | Constantakis et al. |
| 3,763,911 | A | * | 10/1973 | Montagne |
| 4,258,691 | A | * | 3/1981 | Nakayama |
| 5,323,825 | A | * | 6/1994 | Yamagishi et al. |
| 5,345,988 | A | * | 9/1994 | Kabe et al. |
| 5,445,201 | A | * | 8/1995 | Kukimoto et al. |
| 6,006,804 | A | * | 12/1999 | Yokota |
| 6,343,634 | B1 | * | 2/2002 | Suzuki |
| 6,591,880 | B1 | * | 7/2003 | Matsumoto et al. ... 152/209.23 |

FOREIGN PATENT DOCUMENTS

| JP | 4-274906 | * | 9/1992 |
|---|---|---|---|
| JP | 8-2212 | * | 1/1996 |
| JP | 9-11709 | * | 1/1997 |
| JP | 9-150609 | * | 6/1997 |
| JP | 11-342705 | * | 12/1999 |

OTHER PUBLICATIONS

Machine Translation for Japan 9–150609.*

* cited by examiner

*Primary Examiner*—Steven D. Maki
(74) *Attorney, Agent, or Firm*—Rader, Fishman & Grauer PLLC

(57) ABSTRACT

Disclosed is a pneumatic tire effectively controlling uneven wear occurring in the vicinity of a main groove even if a groove width of the main groove is narrowed due to change in tread radius during inflation. In the pneumatic tire, with regard to the main groove having its groove width narrowed during inflation among a plurality of main grooves provided on a tread surface, both groove walls are inclined so that the groove width becomes wider toward the groove bottom, and a protrusion dividing the groove space in the tire width direction is provided at the groove bottom.

3 Claims, 3 Drawing Sheets

PNEUMATIC TIRE INCLUDING PROTRUSION DIVIDING GROOVE SPACE OF MAIN GROOVE HAVING GROOVE WIDTH NARROWED DURING INFLATION

BACKGROUND OF THE INVENTION

The present invention relates to a pneumatic tire provided with a plurality of main grooves extended in a tire circumferential direction on the tread surface. More particularly, the present invention relates to a pneumatic tire capable of controlling uneven wear occurring in the vicinity of the main grooves.

Generally, on the tread surface of the pneumatic tire, a single or plural curvature radius (tread radius), as a curvature, in a tire meridian direction is imparted based on the inner surface shape of a die mold. Meanwhile, in the pneumatic tire, the curvature radius on the tread surface tends to be changed during pressurization due to its inner structures such as a belt layer buried inside the tread portion, tread rubber and the like. When a change in curvature radius on the tread surface occurs in the above manner due to inflation, this change is absorbed by the groove portion, resulting in the occurrence of a phenomenon such as bending of the tread portion at the groove bottom as a boundary. Particularly, in a rib tire provided with a plurality of main grooves extended in the tire circumferential direction, the above bending phenomenon is significant.

As described above, when the tread portion is bent at the groove bottom as a boundary, the edge portion of the rib adjacent to the groove does not match the specified curvature radius of the tread surface, and the ground-contacting pressure in the rib edge portion is significantly changed. As a result, uneven wear occurs with the rib edge portion as a starting point, resulting in a growth of railway wear.

SUMMARY OF THE INVENTION

The object of the present invention is to provide a pneumatic tire capable of effectively controlling uneven wear occurring in the vicinity of a main groove even in the case where the groove width of the main groove is narrowed due to a change in the tread radius during inflation.

A pneumatic tire of the present invention for achieving the foregoing object is a pneumatic tire provided with a plurality of main grooves extended in a tire circumferential direction on a tread surface, characterized in that, with regard to some of the main grooves among the above plurality of main grooves whose groove width is narrowed during inflation, both groove walls are inclined so that the groove width becomes wider toward the groove bottom, and a protrusion dividing a groove space in the tire width direction is provided at the groove bottom. The protrusion comprises a flat top surface and a pair of slanted walls so that the protrusion has a generally trapezoidal shape.

As described above, with regard to the main groove having the groove width narrowed due to the change in tread radius during inflation, by making both of the groove walls inclined so that the groove width becomes wider toward the groove bottom, it is made possible to control the significant change in ground-contacting pressure in the rib edge portions at both sides of the main groove. Moreover, by providing a protrusion dividing the groove space in the tire width direction on the foregoing groove bottom, bending of the tread portion due to the change in tread radius is dispersed onto two points of both sides of the protrusion; therefore, the ground-contacting pressure on the both sides of the main groove can be equalized. Furthermore, it is made possible to absorb, into the protrusion, frictional energy acting so as to cause uneven wear on the rib edge portions of both sides of the main groove. Hence, uneven wear such as railway wear occurring in the vicinity of the main groove can be effectively controlled by the synergy of the inclined structure of both groove walls of the main groove and the protrusion.

In the present invention, if the height of the protrusion is made equal to or lower than the tread surface with a height difference between the top face of the foregoing the protrusion and the foregoing tread surface ranging from 0 to 2 mm, the absorption effect of the frictional energy by the protrusion can be increased during the initial wear. Particularly, the ratio of the protrusion height to the groove depth is preferably set at 0.8 or higher.

The protrusion can be divided in the tire width direction by providing a cut extended in the tire circumferential direction. In this case, the protrusion is better able to absorb the frictional energy. Moreover, a rubber composition constituting the protrusion and a rubber composition constituting the tread surface may be made different from each other. If a rubber composition with a grip property superior to that of the tread surface is selected as a rubber composition of the protrusion, it is made possible to supplement the frictional force of the tire on a wet road surface because of the grip property of the protrusion, even if the volume of the main groove is reduced as the wear progresses.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Hereinbelow, description will be made in detail for the constitution of the present invention with reference to the accompanying drawings.

Figure 1:
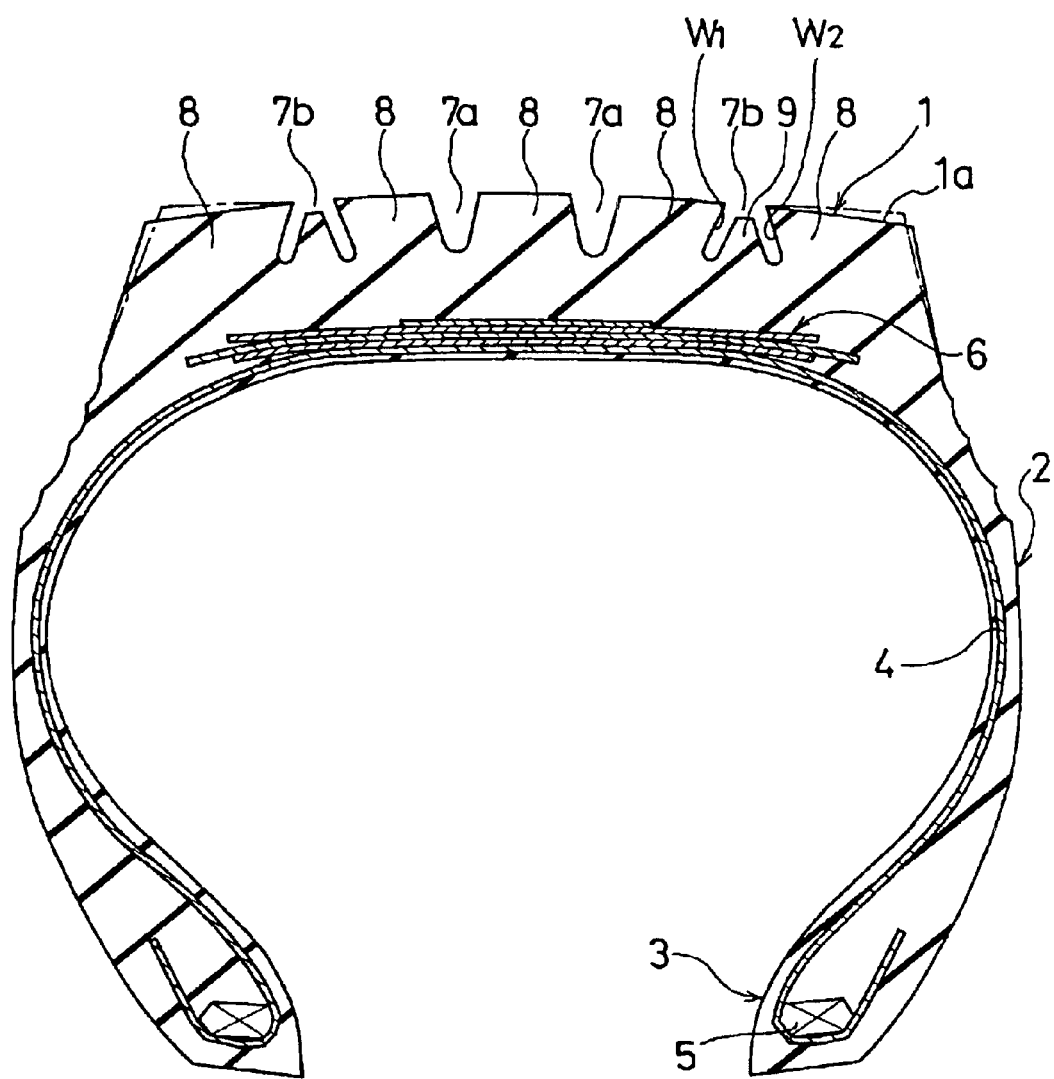
FIG. 1 is a cross-sectional view taken along a meridian direction, showing a pneumatic tire according to an embodiment of the present invention.

FIG. 1 shows a pneumatic tire according to an embodiment of the present invention. A reference numeral 1 denotes a tread portion; a numeral 2 denotes a side wall portion; and a numeral 3 denotes a bead portion. Between a right-and-left pair of bead portions 3 and 3, a carcass layer 4 is bridged, and both end portions thereof in a tire width direction are wound up around bead cores 5 respectively from the tire inner side to the tire outer side. At the outer circumference side of the carcass layer 4 in the tread portion 1, a plurality of belt layers 6 are buried.

Figure 2:
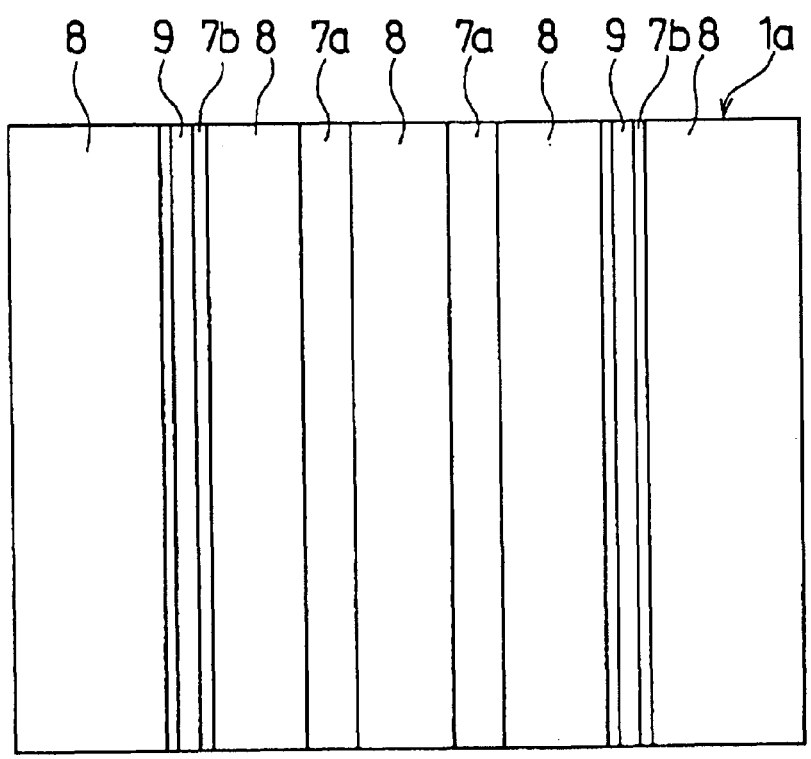
FIG. 2 is a development view showing a tread pattern of the pneumatic tire according to the embodiment of the present invention.

As shown in FIG. 2, on a tread surface 1a, a plurality of main grooves 7a and 7b composed of straight grooves extended in the tire circumferential direction are formed. The main groove 7a is located at the tread center side, and the main groove 7b is located more to the shoulder side than the main groove 7a. These main grooves 7a and 7b define the plural columns of ribs 8. It should be noted that side grooves, sipes and the like, which are extended in the tire width direction, may be provided on the tread surface 1a according to needs.

In the above pneumatic tire, due to the inner structure such as the belt layer 6 buried inside the tread portion 1, tread rubber and the like, the curvature radius of the tread surface 1a is changed during inflation, and the tread portion 1 is bent mainly at the groove bottom of the main groove 7b on the shoulder side as a boundary. As a result, the groove width of the main groove 7b is slightly narrowed compared to that before the inflation. It is possible to intentionally design the tire inner structure causing such a bending phenomenon based on the belt layer 6, the tread rubber and the like. For example, if the circumferential rigidity in the vicinity of the tread center is relatively increased, growth of the outer circumference in the vicinity of the shoulder is relatively increased during the inflation.

Figure 3:
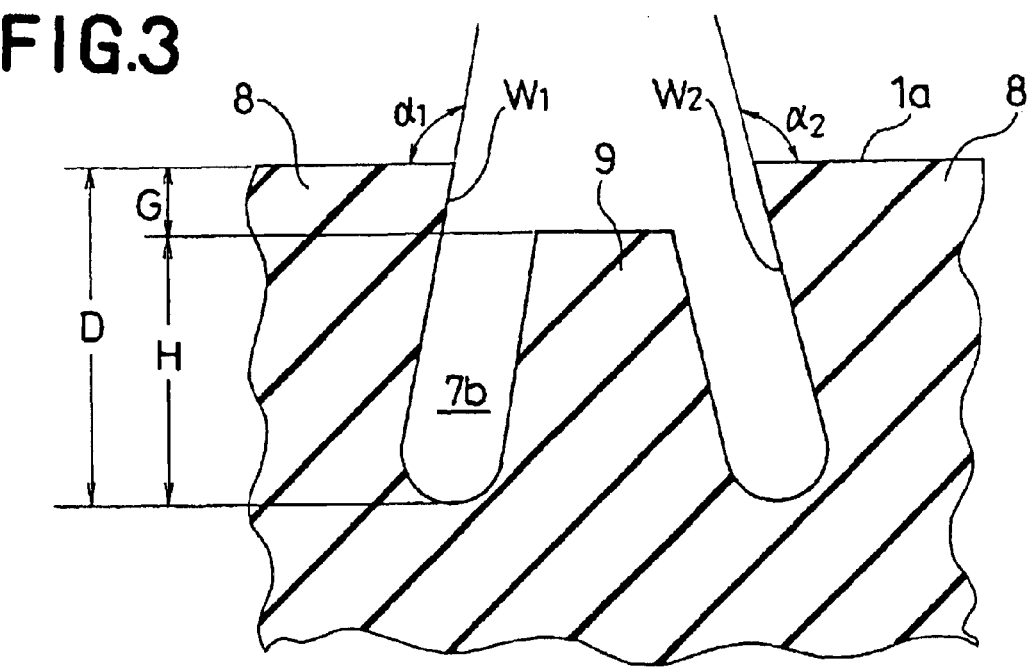
FIG. 3 is an enlarged cross-sectional view showing principal portions of the pneumatic tire according to the embodiment of the present invention.

In the main groove 7b having the groove width narrowed during the inflation, the groove wall $W_1$ near the center is inclined inward in the tire width direction toward the groove bottom, the groove wall $W_2$ near the shoulder is inclined outward in the tire width direction toward the groove bottom, and the groove width is gradually widened toward the groove bottom. More specifically, as shown in FIG. 3, both inclination angles $\alpha_1$ and $\alpha_2$ of the both groove walls $W_1$ and $W_2$ of the main groove 7b with respect to the tread surface 1a are larger than 90°. Moreover, in the central portion of the main groove 7b, a protrusion 9 protruding from the groove bottom is provided so as to be extended in the tire circumferential direction. And by the protrusion 9, the groove space is divided in the tire width direction. Curvature radius are imparted to the groove bottoms of the main groove 7b on both sides of the protrusion 9. Moreover, a cross-sectional shape of the main groove 7b is approximately symmetrical on both sides of the protrusion 9.

As shown by the chain and dotted line of FIG. 1, in the above pneumatic tire, the tread portion 1 is bent mainly at the groove bottom of the main groove 7b on the shoulder side as a boundary during the inflation, and the groove width of the main groove 7b is slightly narrowed compared to that before the inflation. Therefore, the ground-contacting pressure in the rib edge portions continuous with the both groove walls $W_1$ and $W_2$ of the main groove 7b tends to be different from that of other regions. For this, these walls are inclined so that the groove width becomes wider toward the groove bottom as described above, and the rigidity of the rib edge is thus lowered. Therefore, it is made possible to control the change of the ground-contacting pressure in the rib edge portions continuous with both groove walls $W_1$ and $W_2$ of the main groove 7b. Moreover, since the main groove 7b is divided in the tire width direction by the protrusion 9 as a boundary, the bending of the tread portion 1 due to the change in tread radius is dispersed onto two points of the both sides of the protrusion 9. Therefore, the ground-contact pressure on both sides of the main groove 7b can be equalized.

Furthermore, since the protrusion 9 is provided at the groove bottom of the main groove 7b, the protrusion 9 absorbs the frictional energy acting on the rib edge portions continuous with the both groove walls $W_1$ and $W_2$. Therefore, uneven wear such as railway wear occurring in the vicinity of the main groove 7b can be effectively controlled by the synergy of the inclined structure of the both groove walls $W_1$ and $W_2$, and the protrusion 9.

In the above pneumatic tire, the height of the protrusion 9 is made equal to or lower than the tread surface 1a, and a height difference G therebetween is in a range from 0 to 2 mm. By setting the height difference between the top face of the protrusion 9 and the tread surface 1a in the above range, the absorption effect of the frictional energy by the protrusion 9 can be increased during the initial wear. If the height difference G exceeds 2 mm, the frictional energy cannot be absorbed during the initial wear, thus facilitating the uneven wear to occur, and it may result in a growth of railway wear as the wear progresses. For a similar reason, it is recommended that the height H of the protrusion 9 be set to 12 mm or higher, and that a ratio of the main groove 7b to the groove depth D be set at 0.8 or higher.

Figure 4:
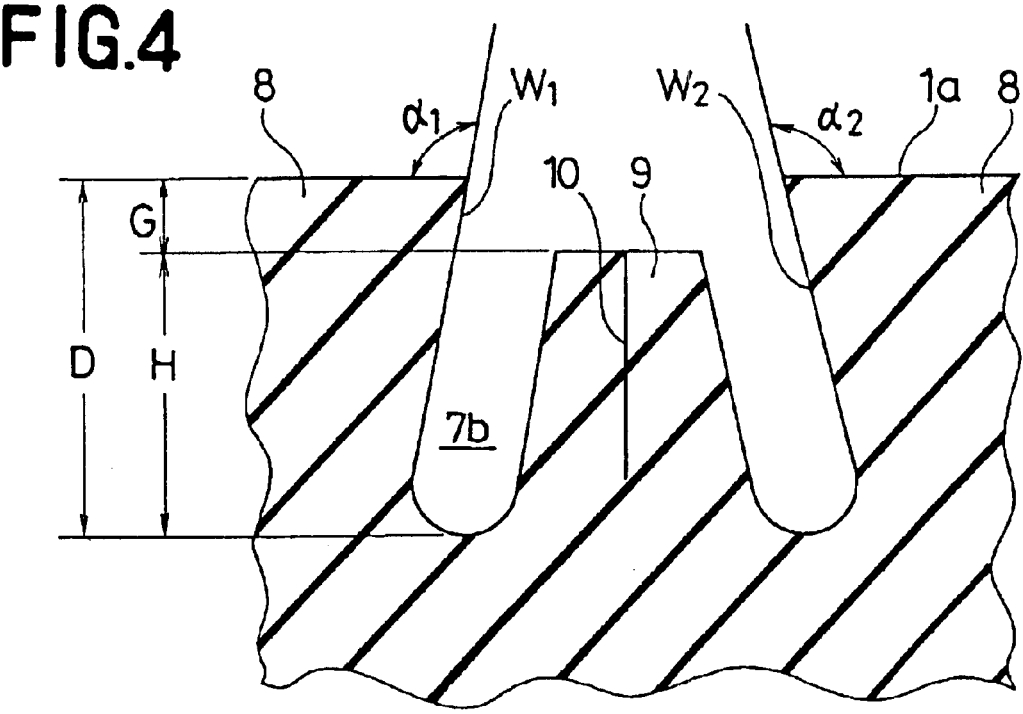
FIG. 4 is an enlarged cross-sectional view showing a modification example of the main groove in the present invention.

As shown in FIG. 4, the protrusion 9 can be divided in the tire width direction by providing a cut 10 extended in the tire circumferential direction. As shown in FIG. 4, the cut 10 forms a first divided protrusion section in facial contact with a second divided protrusion section. When the protrusion 9 is divided as above, the protrusion 9 is better able to absorb the frictional energy.

Figure 5:
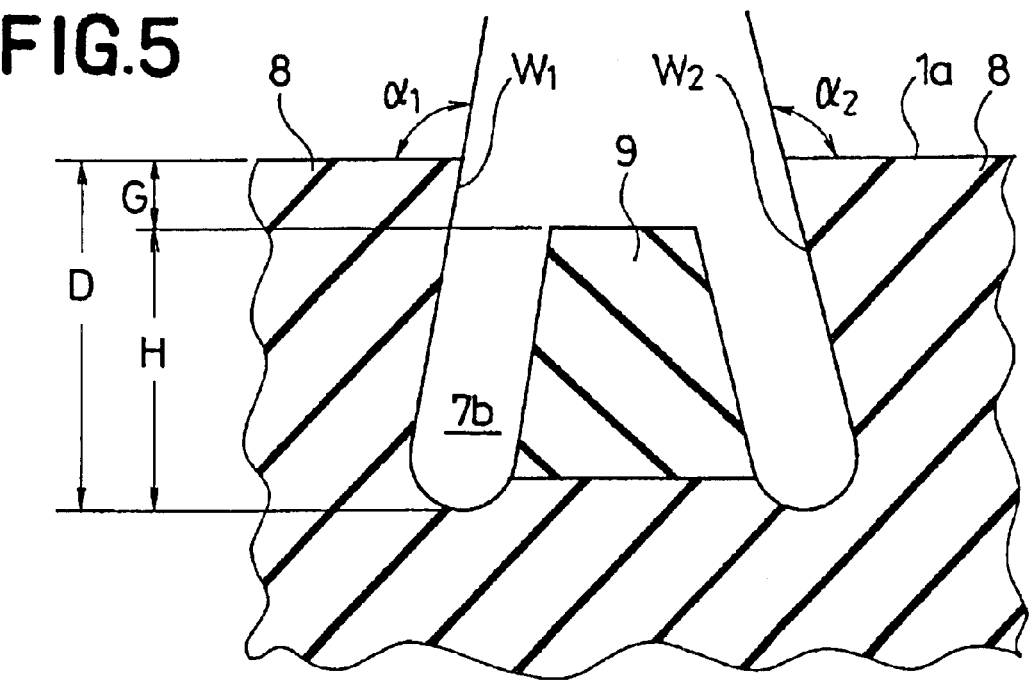
FIG. 5 is an enlarged cross-sectional view showing another modification example of the main groove in the present invention.

As shown in FIG. 5, a rubber composition constituting the 6 protrusion 9 and a rubber composition constituting the tread surface 1a including the rib 8 of a plurality of columns may be made different from each other. If a rubber composition with a grip property superior to that of the tread surface 1a is selected as the rubber composition constituting the protrusion 9, it is made possible to supplement the frictional force of the tire on a wet road surface, which is imparted by the grip property of the protrusion, even if the volume of the main groove 7b is reduced as the wear progresses. Therefore, even if the protrusion 9 is provided on the main groove 7, running performance of the tire on a wet road surface is not lowered.

The present invention is extremely effective in the case where the main groove having a groove width narrowed during inflation is a straight groove; however, the present invention can also be applied to a main groove extended in the tire circumferential direction in zigzags. Moreover, the number of main grooves provided on the tread surface is not particularly limited, and it is satisfactory if the groove width of some of the main grooves is narrowed during the inflation.

EXAMPLE

Tires of the present invention and conventional tires, which have the same tire size of 295/75R22.5 and different tread patterns, were produced.

Tire of the Present Invention

As shown in FIG. 1, in the pneumatic tire provided with a plurality of main grooves extended in the tire circumferential direction on the tread surface, with regard to the main grooves having the groove width narrowed during inflation, the inclination angles $\alpha_1$ and $\alpha_2$ of the both groove walls with respect to the tread surface are respectively set at 100°, the protrusion dividing the groove space in the tire width direction is provided at the groove bottom, and the height difference between the top face of the protrusion and the tread surface is set to 2 mm.

Conventional Tire

In FIG. 1, the inclination angles $\alpha_1$ and $\alpha_2$ of the main groove having the groove width narrowed during inflation with respect to the tread surface are respectively set at 80°, and the protrusion is not provided at the groove bottom.

Uneven wear property of these test tires was evaluated. As a method for evaluating the uneven wear property, two pieces of either the tires of the present invention or the conventional tires were attached as front tires to each of eight trucks, and were made to run mainly on a highway for a hundred thousand kilometers. Thereafter, occurrence of the uneven wear on the tread surface of each tire was observed.

As a result, with regard to the conventional tires, the railway wear occurred in four tires among sixteen tires. On the other hand, with regard to the tires of the present invention, the railway wear occurred only in two tires among sixteen tires, including the one only with a sign thereof.

As described above, according to the present invention, in the pneumatic tire provided with the plurality of main grooves extended in the tire circumferential direction on the tread surface, even if the groove width of the main grooves is narrowed due to the change in tread radius during inflation, the uneven wear occurring in the vicinity of the main grooves can be effectively controlled.

Although the preferred embodiment of the present invention has been described in detail, it should be understood that various changes, substitutions and alternations can be made therein without departing from spirit and scope of the inventions as defined by the appended claims.

What is claimed is:

1. A pneumatic tire provided with a plurality of main grooves extended in a tire circumferential direction on a tread surface, wherein, with regard to a main groove having a groove width narrowed during inflation among said plurality of main grooves, both groove walls are inclined from the tread surface so as to define an acute angle between respective ones of the groove walls and the tread surface so that the groove width of the main groove becomes wider toward a groove bottom of the main groove, and a generally trapezoidally-shaped protrusion dividing a groove space of the main groove in a tire width direction is provided at the groove bottom, the protrusion having a pair of slanted side walls and a flat top surface disposed apart from the groove bottom and connecting the pair of slanted side walls with respective ones of the pair of slanted side walls and the both groove walls being oriented parallel to each other as viewed in cross-section, wherein a height of said protrusion is made equal to or lower than said tread surface, a height difference between said protrusion and said tread surface is set in a range from 0 to 2 mm, the height of said protrusion is at least 12 mm and a ratio of the height of said protrusion to a groove depth of the main groove is set at 0.8 or higher, and wherein said protrusion is divided in the tire width direction by a slit formed into the flat top surface towards the groove bottom and extending circumferentially thereabout to form a first divided protrusion section and a second divided protrusion section in facial contact with the first divided protrusion section at the slit.

2. The pneumatic tire according to claim 1, wherein a rubber composition constituting said protrusion and a rubber composition constituting said tread surface are made different from each other.

3. The pneumatic tire according to claim 1, wherein said main groove having the groove width narrowed during inflation is a straight groove.

* * * * *